(12) United States Patent
Brooks (10) Patent No.: US 8,239,305 B2
(45) Date of Patent: Aug. 7, 2012

(54) METHODS AND SYSTEMS FOR ANALYZING ATTRIBUTES OF INVESTMENTS AND OTHER ASSETS

(76) Inventor: Kent F. Brooks, San Francisco, CA (US)

( * ) Notice: Subject to any disclaimer, the term of this patent is extended or adjusted under 35 U.S.C. 154(b) by 990 days.

(21) Appl. No.: 11/465,233

(22) Filed: Aug. 17, 2006

(65) Prior Publication Data

US 2006/0277132 A1 Dec. 7, 2006

Related U.S. Application Data

(63) Continuation-in-part of application No. 10/892,611, filed on Jul. 15, 2004, now Pat. No. 7,672,889.

(51) Int. Cl.
*G06Q 40/00* (2012.01)
(52) U.S. Cl. .......... 705/36 R; 345/440; 705/35; 705/37; 709/200
(58) Field of Classification Search ................ 705/36 R, 705/35–45, 36
See application file for complete search history.

(56) References Cited

U.S. PATENT DOCUMENTS

| | | | | |
|---|---|---|---|---|
| 5,884,287 A * | 3/1999 | Edesess | ................. | 705/36 R |
| 5,918,217 A * | 6/1999 | Maggioncalda et al. | ... | 705/36 R |
| 5,948,054 A * | 9/1999 | Nielsen | .................. | 709/200 |
| 6,012,044 A * | 1/2000 | Maggioncalda et al. | ... | 705/36 R |
| 6,073,115 A * | 6/2000 | Marshall | ..................... | 705/35 |
| 6,405,179 B1 * | 6/2002 | Rebane | ..................... | 705/36 R |
| 6,564,191 B1 * | 5/2003 | Reddy | ..................... | 705/36 R |
| 6,876,981 B1 * | 4/2005 | Berckmans | ................. | 705/35 |
| 7,062,458 B2 * | 6/2006 | Maggioncalda et al. | ... | 705/36 R |
| 7,089,202 B1 * | 8/2006 | McNamar et al. | ............... | 705/35 |
| 7,366,692 B2 * | 4/2008 | Alcaly et al. | ..................... | 705/37 |
| 7,472,084 B2 * | 12/2008 | Damschroder | ................. | 705/35 |
| 2001/0042037 A1 * | 11/2001 | Kam et al. | ..................... | 705/36 |
| 2002/0007329 A1 * | 1/2002 | Alcaly et al. | ..................... | 705/35 |
| 2002/0007331 A1 * | 1/2002 | Lo et al. | ..................... | 705/36 |
| 2002/0035527 A1 * | 3/2002 | Corrin | ..................... | 705/35 |
| 2002/0073017 A1 * | 6/2002 | Robertson | ..................... | 705/37 |
| 2002/0128941 A1 * | 9/2002 | Champion et al. | ............. | 705/36 |
| 2002/0138386 A1 * | 9/2002 | Maggioncalda et al. | ....... | 705/36 |
| 2002/0147672 A1 * | 10/2002 | Gaini | ..................... | 705/36 |
| 2002/0178105 A1 * | 11/2002 | Levine | ..................... | 705/37 |
| 2003/0009409 A1 * | 1/2003 | Horner et al. | ................. | 705/36 |
| 2003/0009411 A1 * | 1/2003 | Ram et al. | ..................... | 705/37 |

(Continued)

FOREIGN PATENT DOCUMENTS

EP 572281 * 12/1993

OTHER PUBLICATIONS

A. Pollack, "Coming Soon: Data You Can Look Under and Walk Through", New York Times, Oct. 14, 1990, p. F9.*

*Primary Examiner* — Robert Niquette
(74) *Attorney, Agent, or Firm* — Tarek N. Fahmi, APC (57) ABSTRACT

Investors find assistance with determining and/or evaluating relative positions of investments with respect to a variety of evaluation parameters and attributes obtained from a number of data sources. In one embodiment, this involves graphically displaying the relative positions (or locations) of investments with respect to one another and with respect to selectable evaluation parameters and benchmarks for such assets. In some cases, the graphical displays are accompanied by analytical comments that further explain or amplify the information being conveyed graphically.

20 Claims, 5 Drawing Sheets

U.S. PATENT DOCUMENTS

| | | | |
|---|---|---|---|
| 2003/0078874 A1* | 4/2003 | Cope | 705/37 |
| 2003/0088492 A1* | 5/2003 | Damschroder | 705/36 |
| 2003/0093348 A1* | 5/2003 | Finn | 705/35 |
| 2003/0105703 A1* | 6/2003 | Palsky et al. | 705/36 |
| 2003/0126058 A1* | 7/2003 | Hunter | 705/36 |
| 2004/0019549 A1* | 1/2004 | Gulbrandsen | 705/36 |
| 2004/0103052 A1* | 5/2004 | Eapen | 705/36 |
| 2004/0111353 A1* | 6/2004 | Ellis et al. | 705/36 |
| 2004/0117286 A1* | 6/2004 | Charnley, Jr. | 705/36 |
| 2004/0172354 A1* | 9/2004 | Charnley, Jr. | 705/36 |
| 2004/0181427 A1* | 9/2004 | Stobbs et al. | 705/1 |
| 2005/0044028 A1* | 2/2005 | Torres | 705/36 |
| 2006/0241949 A1* | 10/2006 | Tobias et al. | 705/1 |
| 2008/0140559 A1* | 6/2008 | Ram et al. | 705/37 |

\* cited by examiner

METHODS AND SYSTEMS FOR ANALYZING ATTRIBUTES OF INVESTMENTS AND OTHER ASSETS

RELATED APPLICATION

The present application is a continuation-in-part of U.S. patent application Ser. No. 10/892,611, entitled "System and Method for Providing Customizable Investment Tools," filed Jul. 15, 2004 now U.S. Pat. No. 7,672,889 and incorporated herein by reference.

FIELD OF THE INVENTION

The present invention relates generally to computer-implemented tools for assisting investors with determining and/or evaluating relative positions of investments (such as an equity instruments, debt instruments, properties (real or otherwise), collectible items or other assets) with respect to a variety of evaluation parameters and attributes obtained from a number of data sources.

BACKGROUND

The rapid growth of the Internet and personal computing capabilities has had a significant impact on individuals' habits when it comes to managing their investments. As used herein, the term investment is intended to include equity instruments (e.g., stocks), debt instruments (e.g., bonds), properties (e.g., real properties or other, intangible forms of property such as intellectual property rights, whether or not evidenced by patents, trademarks or copyright registrations and the like), collectible items or other assets). Today's investors are able to access information regarding investments and new investment opportunities throughout the world in ways never before possible. Moreover, in an attempt to satisfy their customers' seemingly insatiable appetites for such information, service providers such as brokerage houses, investment managers, investment fund managers, investment information service providers and the like have installed and are operating Internet-based communication tools such as web sites, etc., to allow those customers 24-hour a day access to that information.

Virtually all investors have a need and a desire to understand where their respective investments are positioned with respect to one another and/or with respect to various evaluation parameters and investment benchmarks. Without such information it is very difficult, if not impossible, to make meaningful decisions about managing those investments. Yet the vast information provided by Internet-based broker, investment fund and investor service provider systems (hereinafter, "broker systems") is mostly tabular and distributed across multiple tables and sources, which makes such information very difficult to use when viewed from this perspective. As used herein, the term investor includes both professional (e.g., brokers, investment advisors, mutual and hedge fund managers, money mangers, real estate brokers and advisors, collectible advisors, etc.) and individual, private investors and collectors.

For example, while present day broker systems provide their investor clients with a great deal of basic research information regarding an investment, comparative information is generally not provided, or, if it is provided, it is generally presented in dense, tabular form or in graphical presentations where only one or two investment variables are displayed. To the extent they are available, investment benchmarks (such as consensus analyst price targets, analyst recommendations, investment ratings, and valuation estimates, etc.) and commentary which provides perspectives on investments are not integrated into existing analytical tools. Instead, they tend to be provided in autonomous fashion. Hence, these existing broker systems generally do not permit efficient analysis of the relative multi-dimensional position of investments with respect to each other and to multiple evaluation parameters and investment benchmarks, especially in the case of mutual funds, exchange traded funds (ETFs), industries, markets and models. Obtaining such analyses usually requires an investor to perform a large number of highly independent and only semi-automated steps and processes.

As a result of these shortcomings, investors are frequently faced with the time consuming and error prone process of trying to harmonize multiple independent analyses in order to better appreciate the positions of their investments. Analyzing such relative positions of more than a few investments with respect to a few evaluation parameters in this way is, at best, extremely difficult. Analyzing large numbers of investments, which many investors regularly do, is extraordinarily difficult.

SUMMARY OF THE INVENTION

In one embodiment, the present invention provides for assisting investors with determining and/or evaluating relative positions of investments with respect to a variety of evaluation parameters and attributes obtained from a number of data sources. In one embodiment, the present invention provides for graphically displaying the relative positions (or locations) of investments with respect to one another and with respect to selectable evaluation parameters and benchmarks for such investments. In some cases, the graphical displays are accompanied by comments that further explain or amplify the information being conveyed graphically. The comments may be displayed as text, icons (or other graphical elements) or other visual representations, or, in some cases, may be presented audibly through sound reproductions means (such as speakers and the like) associated with computer systems, telephone handsets, handheld devices (e.g., portable digital assistants, mobile phones, MP3 or other digital media players, etc.), etc.

Dimensions by which locations of investments will be analyzed and presented in graphical fashion are defined. So too are data sources from which attributes of the investments will be selected defined, the attributes being parameters by which the investments are compared with one another; and the investments are presented in graphical fashion as functions of the defined dimensions according to locations defined by each investment's respective attributes.

In some cases one or more benchmark indicators for the investments are presented, within a common graphical presentation with the investments, at a location determined by attributes of the benchmark indicators obtained according to the defined dimensions. The dimensions may include some or all of investment momentum, investment valuation, investment type or style, or investment category. Investment momentum dimensions may include some or all of historic price changes, expected price changes, investment ratings, comparative momentum parameters, historic growth rate parameters, or expected growth rate parameters. Investment valuation dimensions may include some or all of historic or expected valuation according to prices, comparative valuations, historic or expected valuation growth rates, and fair value or discounted cash flow estimates. The dimensions may be expressed as axes of a graphical presentation frameworks within with the locations of the investments are plotted and/or as one or more of investment symbol type, shape, color, or size.

In some cases, comments associated with one or more of the investments' positions may also be presented. The comments are generated according to rules defining same and correlation between said rules and attributes associated with the investments. The comments may be presented within the common graphical framework with the investment positions or reported elsewhere.

In further cases, more than one time period of historical or estimated future location information for one or more of the investments according to the defined dimensions may be presented. The location information may be presented as a series of two or more time period related locations for the one or more of the investments within a common graphical framework. Alternatively, the location information may be presented as locations of the investments according to the defined dimensions and according to user selection of a time period for said presentation. Also, selected time periods may be automatically or manually varied by users to permit time-lapse versions of such analyses.

The investment locations may be presented under multiple sets of criteria conditions. Each criteria condition may involve respective dimensions defined so that common areas of each of a set of graphical frameworks within which the locations of the investments are presented remain semantically similar. Moreover, general areas of the graphical framework which have investment meaning can be defined independently of the investments' positions.

BRIEF DESCRIPTION OF THE DRAWINGS

The present invention is illustrated by way of example and not limitation in the figures of the accompanying drawings, in which.

DETAILED DESCRIPTION

Described herein are systems and methods for assisting investors with determining and/or evaluating relative positions of investments with respect to a variety of evaluation parameters and attributes obtained from a number of data sources. In one embodiment, the present invention provides for graphically displaying the relative positions (or locations) of investments with respect to one another and with respect to selectable evaluation parameters and benchmarks for such investments. In some cases, the graphical displays are accompanied by analytical comments that further explain or amplify the information being conveyed graphically.

Much of the description presented below will make reference to "stocks" or other equity-based assets (a subset of the broader category of "investments" described above). Nevertheless, it is important to recognize that the present invention is not limited to use with such assets. Indeed, the present invention may find applicability for use with any asset or set of assets, especially those associated with multiple sources of professionally compiled statistical information and/or commentary. Thus, the present invention may be used in connection with collectables, items commonly sold at auction, or other such assets. However, because the buying and selling of stocks, mutual funds and other equity- (and debt-) based assets is so prevalent in the United States and elsewhere, the references to such assets herein are believed to be the best means of communicating the features and methods of the present invention to the reader.

Various embodiments of the present invention may be implemented so as to allow investors access to investment information (e.g., through execution of appropriate computer software configured in accordance with the techniques described herein) facilitated by the present invention through existing computer-based facilities provided by brokerage or other information service providers (e.g., as software modules or extensions thereof). The above-cited and related patent application describes means by which such integration may be facilitated. The present methods may be integrated (e.g., as software modules) with the investment tools described in said patent application, or may replace or augment the graphical analysis tools described therein. In other cases, the features of present invention may be implemented as extensions to existing user systems or stand-alone computer software executing on a personal computer or other computer-based device (e.g., a portable computer-based system, electronic organizer, telephone, mobile phone, MP3 or other digital media player, etc.).

As indicated above, although present day broker systems provide their investor clients with a great deal of basic research information regarding an investment, such systems tend to offer only relatively crude analytical tools when it comes to evaluating the relative location of the investment with respect to other investments and with respect to evaluation parameters and investment benchmarks. The present methods and systems help to remedy this situation by allowing investors to quickly determine the relative locations of investments through rich graphical presentations and semi-automated commentary applicable to the data being so presented.

Figure 1:
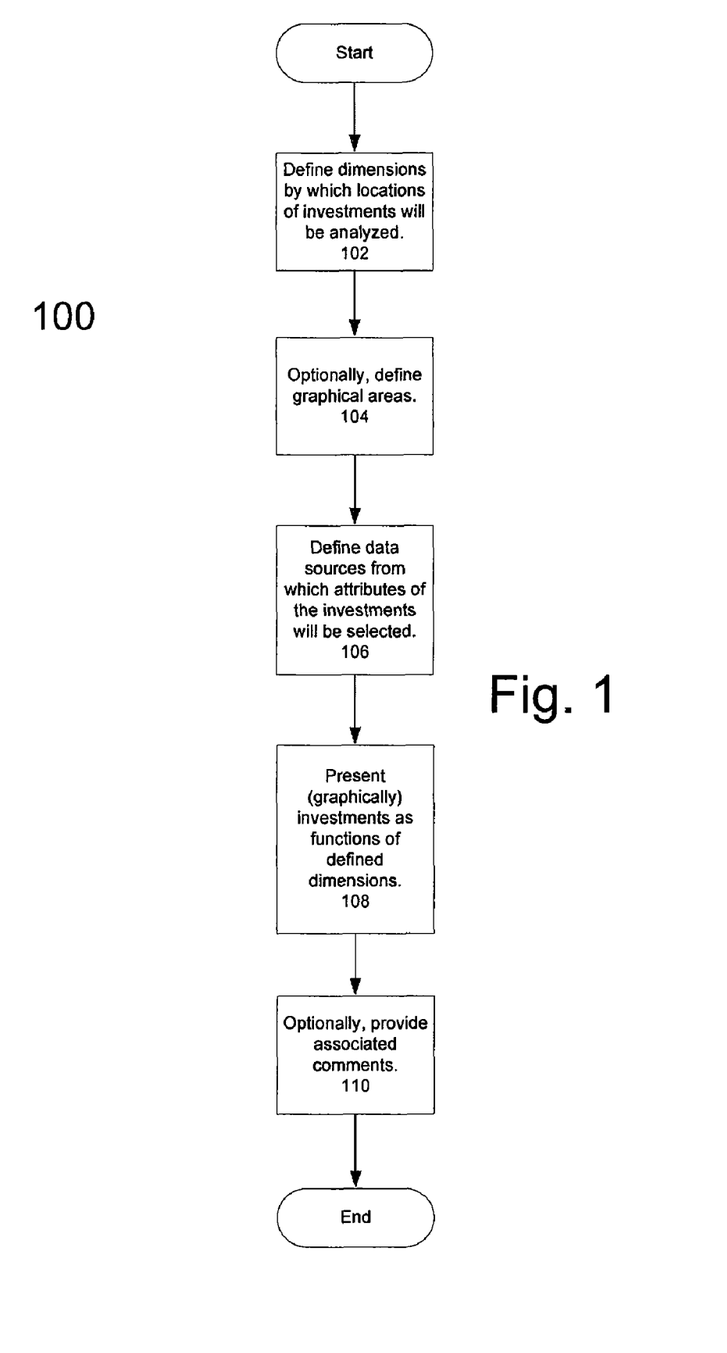
FIG. 1 illustrates an example of a method for graphically displaying the relative positions (or locations) of investments with respect to one another and with respect to selectable evaluation parameters and benchmarks for such investments according to one embodiment of the present invention.

Referring now to FIG. 1, a method 100 for producing graphical investment analysis information according to one embodiment of the present invention is illustrated. Method 100 begins with the definitions of dimensions by which locations of investments will be analyzed (see step 102). Such definition may be performed by a user (e.g., an individual investor), but more often will be performed by investment experts (e.g., providers of broker systems). In this latter case, the user will be able to make use of these predefined criteria for analyzing his/her individual investments. In some cases, combinations of these alternatives may be available. For example, a suite of predefined criteria may be made available for use by users and for more experienced users (or those willing to pay for premium services) the ability to modify or add to those criteria may also be made available.

In essence, defining the dimensions by which locations of investments will be analyzed defines a coordinate system within which investment parameters will be plotted to determine the locations of investments along each dimension (e.g., to be represented as an axis in a graphical presentation). In addition, such definition may include the definition of different symbol types, sizes, patterns, colors and/or other dimensions associated with the individual investments. For example, in addition to conventional "X", "Y" and "Z" axes (i.e., orthogonal, two- and three-dimensional axes), graphical presentations configured in accordance with the present invention may include size dimensions, color dimensions, shape dimensions and other dimensions so as to present, in a collective fashion, a rich set of data regarding individual investments on a two- or three-dimensional plots.

Next, at step 104, graphical areas may be defined. This is an optional process. As will be discussed in greater detail below, one benefit afforded by the present invention is that locations of investments can be analyzed across multiple sets of dimensions while maintaining invariant the relative meaning of the quadrants or other areas of the graphs in which such data is presented. For example, in one embodiment of the present invention an upper right quadrant or area of various graphical presentations may represent a most favorable area for investment across all such graphs, and a lower left area or quadrant a least favorable area. Hence, investors can quickly analyze their investments (or prospective investments, e.g., in the form of a watch list or otherwise) across these multiple sets of dimensions watching for changes in an investment's relative locations and areas across those graphs. Such changes may indicate investments that require further review. Note, this apparent migration when analyzed across multiple sets of dimensions is different than the "time lapse" view of an investment discussed below, which focuses on an investment's location migration with time across an invariant set of dimensions.

The areas defined at this stage can be simple segmentations defined by straight lines (e.g., halves or quadrants), or can be more complex shapes that have additional meaning (e.g., special areas that are highly suggestive of taking investment "short" positions). Multiple sets of area definitions for a given set of investments are permitted, allowing an investor to analyze a common investment location from multiple perspectives.

At step 106, the data sources from which attributes of the investments will be selected are defined. Again, this task will often be done by a professional prior to the individual investor analyzing his/her investments. Usually such professionals can select from many reputable organizations to provide data for a given dimension (e.g., Thomson or Reuters for earnings estimates) upon which investment decisions can be made. Some users (e.g., experienced users) may also wish to view alternate data sources on a graph or may even have compiled their own such data and choose to use same for purposes of the present methods. Examples of data sources by which stock investments can be analyzed may include ratings advertised by well-known providers such as Morningstar, Standard & Poors, Thomson, and others. In some cases, for example where multiple data sources will be used and the information provided thereby combined in some fashion for use in accordance with the present invention, the raw data provided by the data sources may need to be normalized to assure comparability before it is imported for use in accordance with the present methods.

The data itself may include any convenient data by which the subject investments are typically rated or otherwise evaluated. The precise data to be selected will depend on the definition of the dimensions by which locations of the investments will be analyzed. That is, the data sources will be the sources of the attributes of the individual investments, the attributes being the values by which the investments are compared with one another and with investment benchmarks, etc. Examples of investment parameters that can be assigned to dimensions include analyst target price change percentage, analyst recommendations, financial information service ratings, over/under valuations percentages, etc.

Next, the individual investments are presented in a graphical fashion as functions of defined dimensions (see step 108). Such an operation may take place in response to a cursor control event initiated by a user (e.g., a mouse click or similar operation). In this process, the investments are plotted against the defined dimensions using the data obtained from the defined sources for same. The actual investments may be those of the user, a sample set of investments, or another defined set of investments (and here a set may be a single investment). Usually, though not necessarily, the presentation will be invoked in response to a user action, such as a selection (e.g., using a mouse or other cursor control device associated with a computer system) of a button or other object or link. For example, where a user is reviewing his/her investment portfolio through a broker system (e.g., as rendered in a Web page or similar container via a browser or similar computer application), the user may select an appropriate object to cause his/her investments (or selected ones thereof) to be presented in a graphical fashion in accordance with method 100. As part of the process, the user may be provided with options along the lines described above for defining dimensions, defining data sources, and/or defining graphical areas, or most often these selections may be predefined by the users as a set of "preferences" or the like to be used unless the user specifies otherwise.

Thus, it should be apparent that the present methods are amenable to implementation as or using computer software. If written in a programming language conforming to a recognized standard, sequences of instructions designed to implement the present methods can be compiled for execution on a variety of hardware platforms and for interface to a variety of operating systems. The present invention is not limited to implementation in any particular programming language. Furthermore, it is common in the art to speak of software, in one form or another (e.g., program, procedure, application, etc.), as taking an action or causing a result. Such expressions are merely a shorthand way of saying that execution of the software by a computer processor (or similar device) causes the processor to perform an action or produce a result. Unless specifically stated otherwise, where terms such as "processing", "computing", "calculating", "determining", "displaying" or the like are used herein, such terms are intended to refer to the actions and processes of a computer system, telephone, electronic organizer, MP3 or other digital media player, or similar electronic computing device, that manipulates and transforms data represented as physical (electronic) quantities within the computer system's registers and memories into other data similarly represented as physical quantities within the computer system memories or registers or other such information storage, transmission or display devices.

In addition to the graphical presentation, associated comments may, optionally, be provided (see step 110). Such comments may help investors understand the information that is being displayed within the graphical presentation. For example, the comments (as prepared in advance by investment professionals or others) may be selected from a database in which they are stored according to triggers or other indices associated with the investment information presented in the graphical presentation and displayed along side thereof or in some other convenient fashion (e.g., as textual information revealed in pop-up windows as a cursor is moved over various items displayed within or areas of the graphical presentation or as audible presentation of the text). The creation, presentation and use of such comments is discussed further below.

Figure 2:
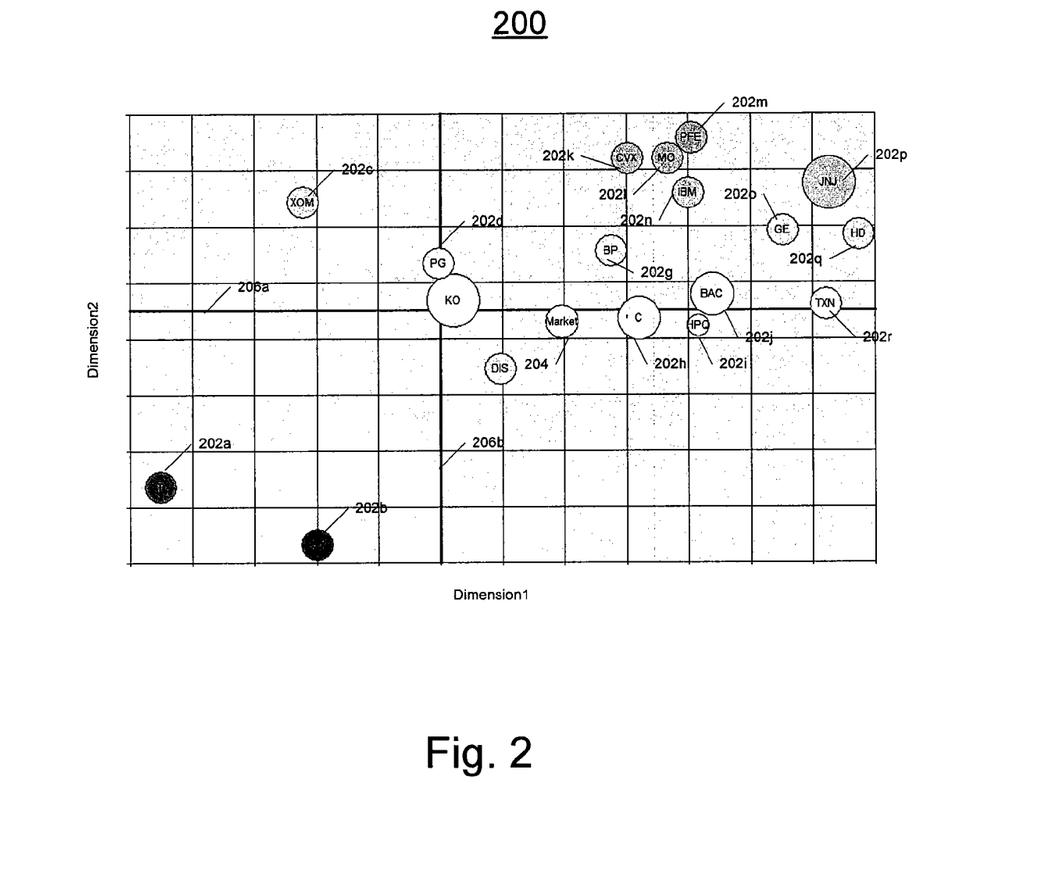
FIG. 2 illustrates an example of a graphical investment analysis produced according to the method illustrated in FIG. 1 according to an embodiment of the present invention.

Method 100 thus provides users with graphical investment analysis tools that enable investors to quickly and effectively understand and compare their investments' locations with respect to other investments and, optionally, with respect to multiple evaluation parameters and investment benchmarks. Referring now to FIG. 2, an example of a two-dimensional graphical presentation 200 generated by the above-described method can be used to analyze the location of investments with respect to each other and to multiple evaluation parameters and investment benchmarks. Each investment's location on the graph is based on that investment's unique attributes, obtained from data sources and selected according to the dimensions defined in accordance with the above-described processes. Each investment is represented by a symbol, 202a-202r, and is plotted according to its locations as defined by its respective attributes in relation to dimension1 and dimension2. In this particular instance, dimension1 and dimension2 have been arranged into orthogonal axes. Such a format is likely to be familiar to the majority of users (and therefore may be considered a preferred format), but it is not the only format by which the dimensions may be arranged. For example, each of dimension1 and dimension2 may be arranged along a common axis with yet a third dimension (e.g., time, etc.) providing a third, mutually orthogonal axis. Or, dimension1 and dimension2 may be presented in some other fashion in order to convey particular meaning to the user. Thus, the present invention is not limited to the use of pairs of orthogonal axes for presenting the attributes of investments obtained from the defined data sources. For example, investors may also associate orthogonal data point symbols, arrangement, or other elements with additional dimensions to be used to provide graphical presentation 200. Therefore, using the present methods the content of two- or three-dimensional presentations may be expanded or amplified through use of data points whose visual characteristics reflect additional attribute dimensions.

Examples of the various dimensions which may be used to provide graphical presentation 200 include momentums, valuations and other dimensions. Examples of such momentum dimensions include, but are not limited to, historic or expected price changes (such as period to date price changes, historic price changes for various timeframes, price targets, price acceleration/deceleration, etc.), investment ratings (such as analyst buy/sell recommendations, etc.), comparative momentum parameters (such as market or industry averages, geographic/location related averages, product or product type averages, etc.) and historic or expected growth rate parameters (such as historic growth rates for various timeframes, growth estimates and targets for various timeframes, growth acceleration/deceleration, etc.). Growth rates can be expressed in many different forms, including but not limited to prices, various income and operating statistics, purchase and rental statistics, occupancy rates, population and demographic statistics, funds flows, trading activity, etc.

Valuation dimensions that could be used in connection with the present invention are also numerous. Examples include, but are not limited to, historic or expected valuations according to prices (such as price to earnings ratios, price to sales ratios, price to cash flow ratios, price to earnings growth ratios, price to rents ratios, price to replacement cost ratios, price to income ratios, used product price to new product price ratios, comparisons to recent sale prices, discounted cash flow valuations, historic valuation changes for various timeframes, price targets, investment valuation ratings, etc.), comparative valuations (such as market or industry valuation averages, geographic/location related averages, product or product type averages, etc.), and historic or expected valuation growth rates (such as historic growth rates for various timeframes, growth estimates and targets for various timeframes, growth acceleration/deceleration, etc.). Growth rates can be expressed in a variety of forms, including but not limited to prices, various valuation related income and operating statistics, rental and purchase statistics, etc.

In addition to defining the axes of graphical presentation 200, other dimensions may be reflected by an individual investment's symbol type, size, color or other characteristics. In the present illustration, all of the investments are shown as circles, however, this need not necessarily be the case. For example, symbols can be representative of an additional data dimension's attribute value, with the relative size of the symbol (whether a circle or otherwise) used as an indication of the investor's relative level of holdings of the particular investment or the size representing a rating associated with the investment. Also, individual stocks could be represented as circles, funds as squares, ETFs as triangles, bonds and bond funds as still further symbols and so on to represent multiple types of investments. Likewise, different colors (or shading or other differentiator) could be used to designate "buy" versus "sell" candidates on watch lists, differences in a dimension's attribute values, industry segments, growth versus income investments and so on. For example, larger circles may be used for those investments which form a substantial portion of the investors overall portfolio and small circles used for holdings of lesser numbers or value. Or these different dimensions may be used for entirely different purposes (e.g., to differentiate investments on the basis of market data for example). Finally, as shown, individual investments may be labeled to provide for easy identification. For example, stock market ticker symbols may be used to label stock, bond and similar investments symbols, and/or labels can also indicate appropriate investment actions like "buy" or "sell" resulting in multi-dimensional symbol labels like "Sell CLX".

Symbol 204 in graphical presentation 200 is not representative of an individual investment. Instead, symbol 204 is illustrative of the relative location (with respect to dimension1 and dimension2) of the "market" (hence the label of that name). In one example the "market" may be based on well-known metrics of the stock markets in which the other investments represented within graphical presentation 200 trade, but this need not necessarily be the case. For example, the "market" may be a summary of recent auction activity regarding the types of investments so displayed.

Regardless of its specific meaning, the "market" symbol is an optional feature of the present invention. As was the case for the individual investments 202a-202r, attributes for the "market symbol" may be obtained from information provided by one or more data sources (which may or may not be the same data sources as those used for the investments) in the fashion described above and the market symbol plotted in presentation 200 according to all of the same dimensional characteristics used for the individual investments. By having a "market" symbol presented within the graphical presentation 200, the investor is provided with information for his/her individual investments with respect to the corresponding market benchmarks or information by which the market symbol is defined.

Graphical presentation 200 has been divided up into different areas (in this case quadrants of unequal area) by lines 206a and 206b. As indicated above, such division is optional, but dividing presentation 200 into such distinct areas can help to communicate information regarding the positions of investments portrayed therein. Such areas can be simple quadrants of the space defined by dimension1 and dimension2, as shown in the example, or can have more complex shapes. The present invention permits the location of the lines 206a and 206b to be adjusted based on any of several factors, including an individual investor's preference (e.g., to delineate historical, current or trended means, modes, medians, etc.) or a professional analyst's recommendations (e.g., which differentiates more preferred from less preferred investments based on the analyst's selection criteria for each respective graphical dimension). Such factors can be taken into consideration during the definition of the dimensions of the graphical presentation described above. In addition to providing investors with meaningful and tailorable graphical areas, color coding of these areas may also be used to enhance the presentation of information and make the investor's analysis more intuitive or to add dimensional depth.

Use of graphical areas is particularly valuable to investors, when similar areas in different graphs have similar meanings. For example, if different graphical presentations (regardless of the dimensions for which the presentations are constructed) are organized such that the upper right area (or any other convenient area (e.g., a central circular area)) will consistently include those investments deemed to be the most attractive for the particular dimensions under consideration, investors will be able to more quickly and easily orient themselves and compare various analyses.

Consider for example a situation in which an investor wishes to analyze her portfolio of investments against multiple different criteria (represented by multiple different sets of dimensions). Each of these criteria conditions will have an associated graphical presentation (similar to presentation 200) produced according to the above described methods. In accordance with an embodiment of the present invention, during the definition of the dimensions for each of the criteria conditions, the dimensions are organized so that when the presentation is provided to the investor, the upper right area (or other convenient area) of presentations will display the most attractive investments of that presentation's analysis.

Figure 3:
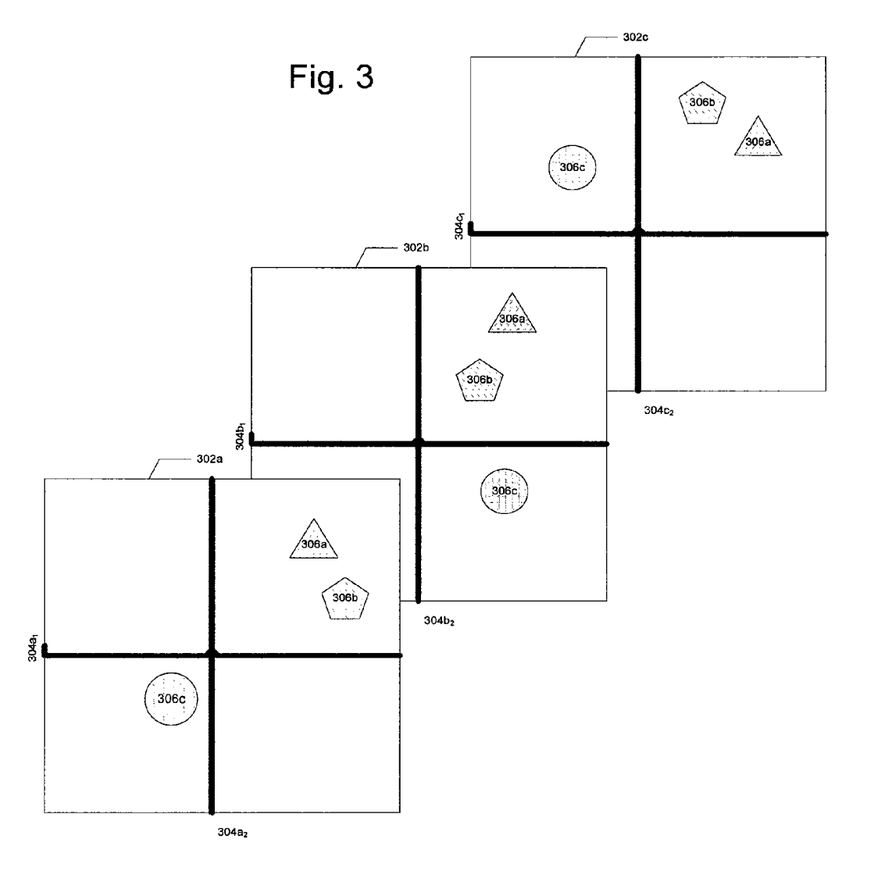
FIG. 3 illustrates an example of maintaining invariant semantic meaning to locations across multiple graphical investment presentations developed according to methods consistent with the present invention.

An example of this situation is depicted in FIG. 3, which shows three graphical presentations 302a, 302b and 302c, each associated with its own set of respective dimensions $304_{a1}$, $304_{a2}$; $304_{b1}$, $304_{b2}$, and $304_{c1}$, $304_{c2}$. In some cases, some of these dimensions may be common across the different graphical presentations. Three investments' locations 306a, 306b and 306c, are plotted based on their data attributes associated with the dimensions defined for each graphical presentations. Notice that under different graphical evaluations, the relative locations of the investments move with respect to one another and, in this example, with respect to benchmarks for the different dimensions (represented by lines defining quadrants for each presentation). In this example, only two dimensional parameters were changed for each presentation, but in general multiple such dimensions could be so altered. In each case, the dimension's benchmark lines were placed so that the most attractive investments locations would be within the upper right quadrant of the presentation (regardless of the dimensions under consideration). Thus, the investor may rapidly progress through presentations with differing dimensions, recognizing that the most attractive investments of each presentation will always be in the upper right. Stated differently, the present invention permits the locations of investments to be compared across multiple sets of dimensions and their benchmarks while maintaining invariant the relative investment meaning of the quadrants or other areas defined in the graphical presentations.

By appropriate selection and scaling of the available dimensions, the methods of the present invention permit investors to quickly and intuitively analyze the sensitivity and variability of one or more investments to changes in various investment parameters. In the example shown in FIG. 3, it can be observed that the relative position of investment 306a changes immaterially without regard to whether criteria "a", "b" or "c" defines the conditions under consideration. Investment 306b, on the other hand, has substantially greater variability, although in each condition investment 306b remains in the preferred quadrant of the presentation. The relative position of investment 306c is shown be substantially dependent on the criteria under consideration, is not consistently within a single quadrant of the presentation, and is in no analysis in the "most attractive" quadrant.

Figure 4:
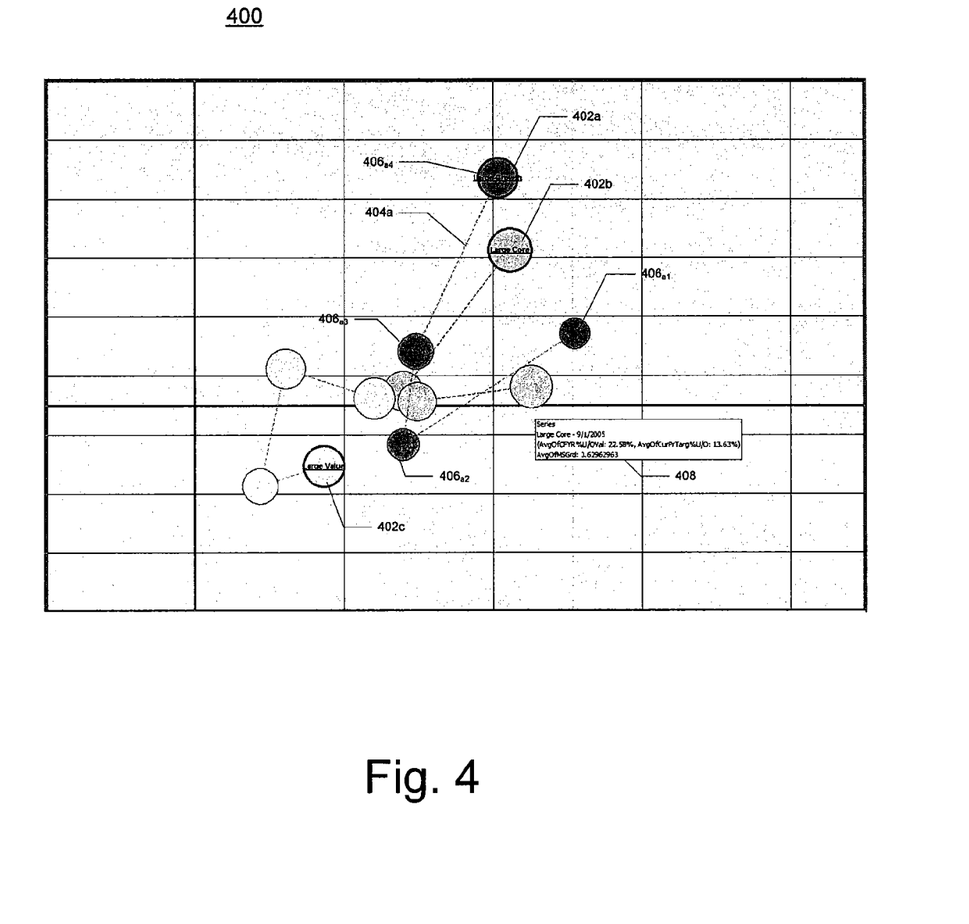
FIG. 4 illustrates an example of "time-lapse" graphical investment presentation developed according to methods consistent with an embodiment of the present invention.

To this point, the graphical presentations that have been discussed may be regarded as providing a "snapshot" of an investment's or plurality of investments 'locations at one point in time. However, the present invention can also be used to provide information regarding said locations over multiple points in time or market conditions (e.g., a time-lapse or "beginning recession market condition" basis). FIG. 4 illustrates an example of a time-lapse graphical presentation 400 configured in accordance with and produced by an embodiment of the present invention. The presentation is created in the same fashion as discussed above, however, this time the investments attributes are displayed for the defined dimensions and data sources for multiple points in time. Therefore, multiple time period's of investment information can be displayed concurrently or in time-lapse motion. For example, the historical values of the "percentage analyst price target change" or the "20-day price momentum" statistics of a stock investment may be made available for display in various types of time-lapse presentations.

When the investment attribute data is presented in the graphical fashion, historical information or future estimates can be used to "track" investment location movement and "paths" within presentation 400. Of course, such time periods can be set according to user preference or expert control, and the same is true for the type of data collected, etc.

In presentation 400, tracks or time-lapse movements of the locations of three investments 402a, 402b and 402c are shown. In this example, track 404a, is associated with investment 402a. It shows the relative location of investment 402a beginning at position $406_{a1}$, then moving to location $406_{a2}$, from there to location $406_{a3}$ and finally to location $406_{a4}$. The track may or may not be indicated by lines or other connectors between these individual location symbols. An investment's most current location is highlighted by bold symbol outlines and labels (or other indicators) describing the type of investment, and earlier positions are connected to it by lines and on "mouse over" or other cursor control event may reveal information (e.g., such as the associated date of the information), however, such a presentation format is arbitrary. It is also important to note that all symbol attributes that change over time can also be optionally reflected, for example, investment 406's symbol size dimension at time a4 is much larger than at time a1.

In addition to the track information, further information regarding the investments may be displayed within pop-up windows or other similar display elements 408. For example, such display elements may be used to present information regarding the type of investment, the duration of the track history, and other information of interest. The means by which the display of such information elements within a graphical presentation of the present type is known in the art and will not be discussed further herein.

In some cases, the relative movement of one or more investments within the presentation defined by the selected dimensions may be animated so as to truly highlight the movement in the investment's relative location. For example, an investor may request a fully automated animation or use a cursor control device to activate a time line or other tool (e.g., a slider tool) to simulate the passage of time (forwards or backwards) and thereby control the location of the investment(s) displayed within presentation 400. Such techniques for moving objects within graphical presentation according to time or other criteria are known in the art and will not be further described herein.

Above it was indicated that the present methods could be used in connection with mutual fund, ETF style and industry analyses, and that is so. However, sometimes investors may wish to compare his/her individual investments against the individual positions of the components of a well-known funds or other investment groupings to see how the investor's own investment decisions have performed relative to those of the fund. The present invention can accommodate such interests by computing and then presenting the implied positions of assets of a fund, ETF, industry or other grouping.

Figures 5, 6A:
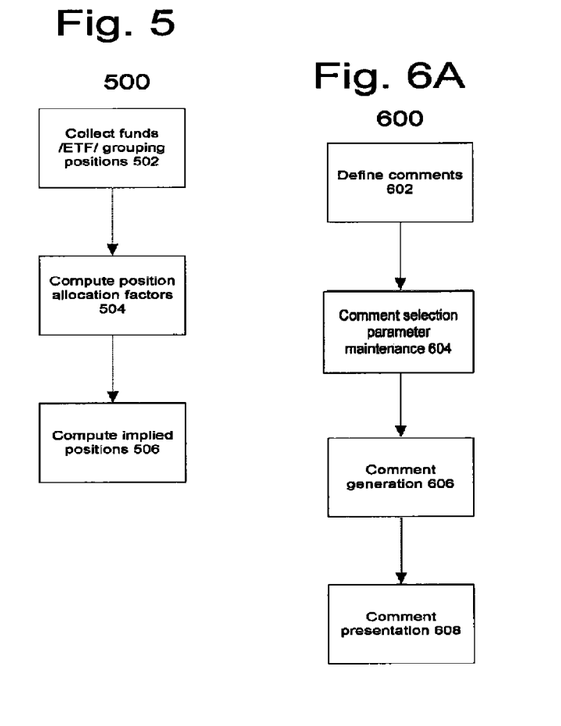
FIG. 5 is a flow diagram illustrating methods of computing implied positions of mutual funds, ETFs, industries, etc., according to one embodiment of the present invention.
FIG. 6A is a flow diagram illustrating methods for producing comments for use in connection with graphical presentations and analyses developed according to embodiments of the present invention.

Referring to FIG. 5, computing the implied positions of a mutual fund or ETF may be done using method 500. First, at 502, the positions of the various components of a fund are collected. This involves determining what the components are (e.g., from a defined data source or other c) and obtaining the attribute information for the dimensions under consideration for each of the individual assets. Then, at 504, the individual positions of the assets are allocated according to the manner in which the fund is composed. Finally, at 506, the implied positions of each of the fund's components is computed according to the allocation parameters. With this information, the implied positions can be presented graphically using the above described methods and treating the funds assets as individual investments.

Turning now to FIG. 6A, a method 600 for providing comments to be associated with either the above-described graphical presentations or traditional tabular presentations is illustrated. Method 600 is an example of how automated comments helpful for analyzing the visual information depicted in the graphical presentations may be produced, maintained and provided within the framework of the graphical presentation. Such comments may be customizable according to investor profile, preferences or other criteria.

Initially, step 602, the comments are defined, for example by a group of experts based on important dimension characteristics for the investments under consideration. For example, each day at the close of trading or even throughout the day, comments may be automatically generated regarding individual investments locations compared to the expert's criteria, investment or market benchmarks, or other items or activities of interest to investors. While it is expected that the automated comments will be defined by experts, in some embodiments of the invention this need not necessarily be so. Individual investors might define their own automated comments, and share those with other investors through group dissemination (e.g., as part of a forum of investors or group discussion board, etc.). Such user forums or boards have become common place in Web-based environments and insofar as the present invention may find applicability within such environments (e.g., as part of a broker or web portal's systems) the ability to incorporate these forums or similar group discussion formats may be seen as an advantage for more experienced investors.

Automated comment definition thus involves identifying the specific conditions for which an automated comment will be generated, the text or other information that makes up the body of the comment, and any additional data needed to process the comment. In a simple example, a text-based comment could be defined with an eye towards alerting or advising an investor to consider selling an investment in his/her portfolio. Such a comment may be associated with any investment which shows a negative trend when measured against a defined set of dimensions over a selected time period. In response to the generation of a graphical presentation (along the lines discussed above) that included such an investment, the comment may be presented along side the affected investment(s), or in another convenient area of a display in which the graphical presentation is provided (e.g., within a pop-up window or elsewhere). In an alternative example, a comment could be defined which would suggest that an investor investigate buying specific investments that exhibit positive trends. Such comments may be useful in connection with an investor's watch list or elsewhere. Comments may be specific to individual investors or investments, or more broadly applicable to markets, or other criteria.

Comments have selection rules associated with investments identified within their presentations. These selection rules are evaluated when graphical or tabular presentations are being processed according to the above described methods, and where appropriate, comments are generated and presented in the context of those presentations. As indicated at the outset of this discussion, such comments are purely optional.

Regardless of how the comments are defined, the attribute statistical cutoffs associated with inclusion of investments in the comments must also be maintained (step 604). Again, this activity may be performed by experts and/or by individual investors. The maintenance referred to is normally periodic tailoring of comments cutoffs. Further, individual investors will likely want to tailor the type of comments they receive to those applicable to their individual investment style or circumstances, so individual investors may want to perform maintenance related to selecting which comments they receive, or may wish to receive comments only from select sources of same, for example trusted analysts (or other investors). Hence, the maintenance referred to in method 600 encompasses all such maintenance, both of the comments themselves and of the investors reception of/exposure to same.

Automated comments maintenance also involves personalizing comments that are created/defined for global applicability. For example, a comment might have been defined with a corresponding rule to identify any investments in a portfolio that are overvalued by a certain amount. This definition may be done by an expert but the threshold value could be manipulated by different individual investors at step 604, so that different investors could use the same comment definitions, but have flexibility to use personalized variations of same for their individual accounts.

As indicated above, once the comments are defined and, optionally personalized or otherwise maintained, they are generated (step 606) in connection with the creation of graphical or tabular presentations. That is, the determination of whether an individual comment is applicable to a particular graphical presentation is made when the presentation is created for the investments under consideration. This involves evaluating the investments and other information presented in the graphical presentation against the rule associated with the comments. When the rules associated with a comment are satisfied, the corresponding comment is displayed along with the investments satisfying the rules (608). Comments could be displayed real-time, or saved for later use in a delayed display that also consolidates other comments and information.

As indicated above, comments may be displayed as text, presented in audible formats, or both (e.g., using conventional text to speech conversion tools in which case the comments may be played out through a variety of electronic devices including personal computers, televisions, telephones, electronic organizers, MP3 or other digital media players, etc.).

Figure 6B:
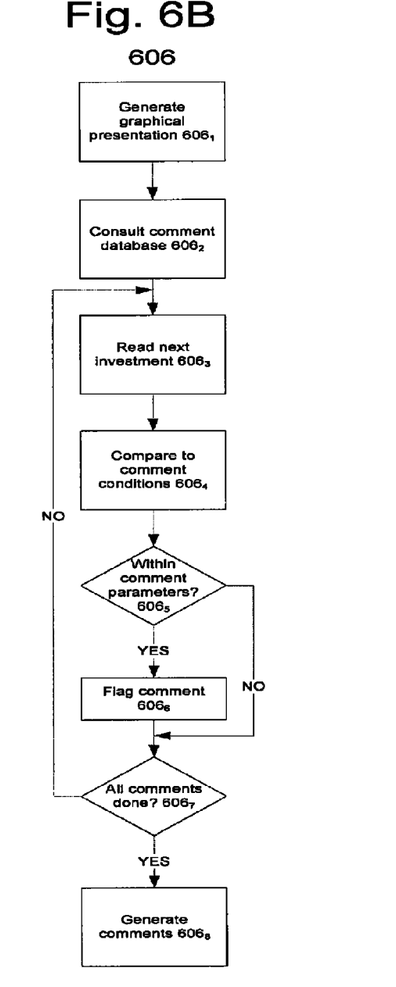
FIG. 6B is a flow diagram illustrating further details of methods for producing comments for use in connection with graphical presentations developed according to embodiments of the present invention.

FIG. 6B illustrates in further detail an example of how previously defined comments may be generated (606) in connection with the creation of a graphical presentation. First, at step $606_1$, in response to a graphical presentation being generated a comment definition database is consulted ($606_2$) to determine if any predefined comments are applicable for the analysis being presented by way of the graphical presentation. This may be done in any convenient way. For example, during the comment definition certain tags may be associated with the comment (or more specifically the rules for presenting the comment) that could provide for rapid look-up or sorting. Such tags may be based on any convenient parameter, such as the name of the investment under consideration. An example of a rule associated with a predefined comment could be one that identifies stocks that are potentially highly overvalued (where what is and is not overvalued is subject to user refinement).

This analysis inquiry may be performed investment-by-investment, in each case reading the subject investment ($606_3$) comparing it with the comment conditions/tags ($606_4$) to determine if a subject comment is applicable ($606_5$). If comment is determined to be applicable to an investment or other condition to be depicted in the subject graphical presentation, the investment's identity is added to the comment's investment list for later presentation ($606_6$), otherwise it is skipped. This process continues until all investments in the analysis are reviewed ($606_7$). Once all the investments are reviewed, the comments and their qualifying investments are generated ($606_8$) and presented (608) as discussed above.

Brokers, investment service providers, application software providers or publishers can deploy the present analytical methods by either programming the present methods into their existing systems; utilizing application software packages that support the methods in their existing systems, or linking to analytical tool servers that support the present methods. Therefore, although discussed with reference to several embodiments, it should be remembered that the scope of the present invention is not to be limited thereby, and instead should only be measured in terms of the claims, which follow. In the foregoing description, for purposes of explanation, numerous specific details were set forth in order to provide a thorough understanding of the present invention. It will be evident, however, to one skilled in the art that the present invention may be practiced without these specific details. In some instances, well-known structures and devices were shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

The present invention can be implemented by an apparatus for performing the operations described herein. This apparatus may be specially constructed for the required purposes, or it may comprise a general-purpose computer or other electronic computing capable device, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, telephones, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

A wide variety of investment analysis systems may utilize the investment analysis methods and systems of the present invention. Investors can utilize investment analysis systems in conjunction with a variety of computer and communication devices such as personal computers, electronic organizers, mobile phones, etc. Investment analysis systems can be primarily accessible through the internet or other communications network or can be fully or partially resident on the devices. The present investment analysis methods and systems can be delivered to investors as a part of a brokerage or investment information service, publication service, or as a part of application software products.

What is claimed is:

1. A computer-implemented method, comprising:
   obtaining values of specified attributes of multiple investments from selected data sources supporting investment decision-making;
   generating, responsive to specification of sets of coordinate systems, a graphical framework including symbolic representations of the multiple investments, each of the symbolic representations being located and characterized within the graphical framework based on the specification of the coordinate systems and the attributes of respective ones of the multiple investments, wherein the sets of coordinate systems are defined so that similar areas within each individual coordinate system of the sets of coordinate systems have similar meaning across all coordinate systems that comprise the set; and
   presenting, in response to receipt of a user input, the graphical framework by which the symbolic representations of the multiple investments are displayed concurrently for comparison with respect to one another within the coordinate systems, wherein
   obtaining the values and generating and presenting the graphical framework are performed by a processor under control of computer-executable instructions stored on a computer-readable medium, said computer-executable instructions specifying actions for: (i) defining each coordinate system's dimensional characteristics which control positions and natures of the symbolic representations of the multiple investments, and (ii) creating and positioning the symbolic representations of the multiple investments within the graphical framework as functions of dimensions of their attributes.

2. The method of claim 1, further comprising presenting, within the graphical framework, one or more comparative benchmarks for said attributes of the investments at locations determined by values of the benchmarks within the dimensional characteristics of the coordinate systems.

3. The method of claim 1, wherein the dimensional characteristics include some or all of investment momentum, investment valuation, investment type, investment style, and investment category.

4. The method of claim 3, wherein investment momentum includes some or all of historic price changes, expected price changes, investment ratings, comparative momentum parameters, historic growth rate parameters, or expected growth rate parameters.

5. The method of claim 3, wherein investment valuation includes some or all of historic or expected valuation according to prices, comparative valuations, historic or expected valuation growth rates, and estimated or modeled fair or discounted cash flow valuations.

6. The method of claim 1 wherein the dimensional characteristics are expressed as axes of the coordinate systems represented in the graphical framework and within which investment positions are located according to respective values of their respective attributes.

7. The method of claim 1 wherein some of the dimensional characteristics are expressed as one or more investment symbolic representations comprising one or more of symbol types, shapes, colors, patterns, or sizes.

8. The method of claim 1, further comprising presenting additional comments associated with relative positions of one or more of the symbolic representations of the investments within the coordinate systems.

9. The method of claim 8, wherein the additional comments are automatically generated according to said comments' investment location rules and criteria and a determination that locations of the investments within the coordinate systems correspond with said rules and criteria.

10. The method of claim 9 wherein the additional comments are presented as one or more of text or audible comments.

11. The method of claim 1, wherein presenting comprises including location information for respective values of respective attributes of one or more of the investments for multiple time periods.

12. The method of claim 11, wherein the location information for respective values of respective attributes of the one or more of the investments is presented as a series of two or more locations, each representative of a particular location of a respective investment at a corresponding one of the time periods within the coordinate systems.

13. The method of claim 11, wherein the location information is presented according to user selectable time periods.

14. The method of claim 1, wherein presenting comprises displaying the investment locations within multiple ones of the coordinate systems, each representative of a different combination of the dimensional characteristics.

15. The method of claim 14, wherein for a group of the coordinate systems, respective dimensions are defined so that the similar areas in each respective coordinate system are semantically similar to one another and meaningful to investors.

16. The method of claim 1, further comprising defining and displaying areas within the coordinate systems which have general investment meanings, independent of the presentation of individual investment locations.

17. The method of claim 16, further comprising presenting comments identifying areas within the coordinate systems which have general investment meanings, and identifying those of the areas to which said comments apply as functions of the dimensional characteristics according to locations and symbolic representations defined by respective values of each investment's respective attributes.

18. The computer-implemented method of claim 1, wherein the attributes of the multiple investments and the data sources are selected by investment professionals.

19. The method of claim 18 further comprising presenting comments concerning one or more of said investments according to correlations between said locations of said investments within said coordinate systems and rules defining selection and generation of said comments.

20. The method of claim 18, wherein said presenting is performed in response to a cursor control operation performed by a user.

* * * * *